March 3, 1959

B. F. GREGORY 2,875,599

UNIVERSAL JOINT AND LUBRICANT
RETAINING HOUSING THEREFOR

Original Filed April 29, 1955

INVENTOR.
Benjamin F. Gregory
BY
Paul E. Mullendore
ATTORNEY

United States Patent Office 2,875,599
Patented Mar. 3, 1959

2,875,599
UNIVERSAL JOINT AND LUBRICANT RETAINING HOUSING THEREFOR

Benjamin F. Gregory, Kansas City, Mo.

Original application April 29, 1955, Serial No. 504,754, now Patent No. 2,822,880, dated February 11, 1958. Divided and this application December 5, 1957, Serial No. 700,890

5 Claims. (Cl. 64—21)

This invention relates to universal joints, and particularly to those of constant velocity, as disclosed in my copending application for patent on front wheel hub for front wheel drive and universal joint therefor, Serial No. 504,754, filed April 29, 1955, now Patent No. 2,822,880 and of which the present application is a division.

Universal joints of the constant velocity type include driving and driven members that are interconnected in driving relation by balls operating in grooves formed in the facing sides of the respective driving and driven members. Such universal joints have many advantages in that they do not cause speed fluctuations in the driving member and they operate efficiently under substantially high relative angularity conditions. They also have a higher load capacity for a given size, are more compact, and operate with less friction. However, such universal joints are difficult to lubricate because the balls, when rolling in the grooves of the joint members, displace the lubricant therefrom and into the flexible housing within which such joints have previously been enclosed, with the result that the ball grooves are soon depleted of lubricant.

It is, therefore, a principal object of the present invention to utilize the displacement effect of the balls during relative angular movement of the joint members for forcing the lubricant alternately from one side of the joint to the other, thereby keeping the movable parts of the joint constantly supplied with the lubricant.

It is also an object of the invention to provide a rigid housing to enclose the joint and to contain the lubricant.

A further object is to provide effective seals between the housing and the working parts of the joint.

In accomplishing these and other objects of the invention as hereinafter pointed out, I have provided improved structure, the preferred form of which is illustrated in the accompanying drawing, wherein.

Figure 1:
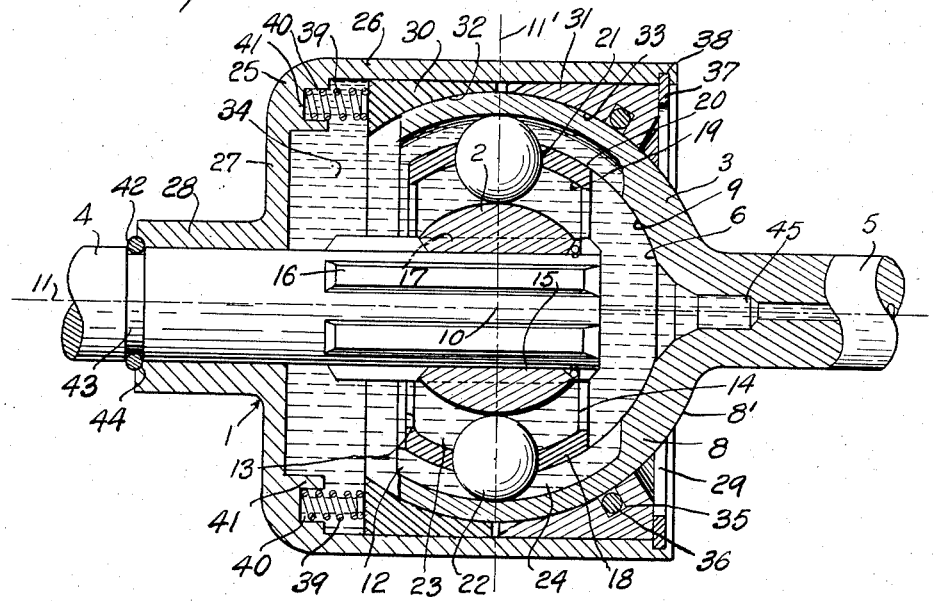
Fig. 1 is a longitudinal section through a universal joint and housing therefor which embodies the features of the present invention, the driving and driven members being shown in coaxial alignment.

Referring more in detail to the drawings:

1 designates a constant velocity type of universal joint constructed in accordance with the present invention, which includes relatively movable members 2 and 3, respectively mounted on shafts 4 and 5 that are interconnected thereby for transmitting power of a prime mover to a driven mechanism. Either shaft may be the driving or driven shaft. The member 3 is of ball shape and has a spherical cavity 6 for containing the member 2. The member 3 of the joint has a generally spherical wall 8 providing a spherical exterior surface 8' and a spherical interior surface 9 for the cavity 6, with the center of curvature indicated at 10 and located at the crossing points of the dot and dash lines 11 and 11', as shown in Fig. 1. The end of the wall 8 opposite the shaft 4 has an opening 12 to admit the member 2 therethrough when it is inserted in the inner spherical cavity 6.

The member 2 is preferably in the form of a belt of a sphere, in that it has flat end faces 13 and 14. A bore 15 is formed in the axial center of the member 2 of the joint for accommodating the end of the shaft 5. The member 2 is fixed to the shaft 4 by splines 16 engaging in corresponding grooves 17 within the circumference of the bore 15.

Figure 2:
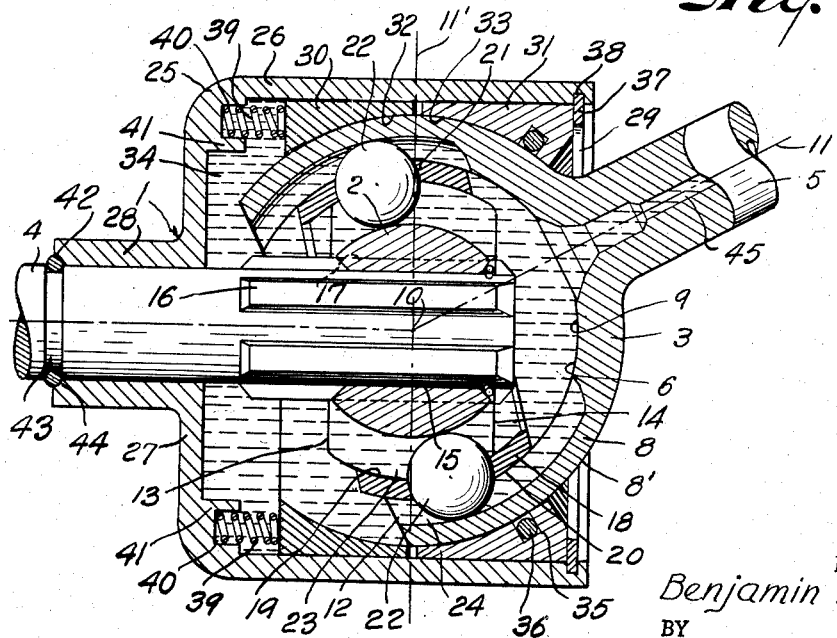
Fig. 2 is a similar section, but showing the driving member moving angularly in accordance with the action of the joint when in use.

The radius of the spherical face of the member 2 is less than the radius of the inner face of the cavity 6 to accommodate a retainer 18 therebetween and which is also in the form of a belt of a sphere and has inner and outer spherical faces 19 and 20, respectively, which may loosely contact the inner and outer faces of the members 2 and 3, as shown. The retainer 18 is provided about the circumference thereof with openings 21, each containing a ball 22 that is adapted to roll within registering grooves 23 and 24 in the respective members 2 and 3, as shown in Fig. 2. The grooves 23 and 24 provide passageways for the balls 22 when the shafts 4 and 5 change their relative angular relationship upon rotation thereof, as when transmitting power of a prime mover to a driven mechanism. The grooves 23 and 24, together with the balls 22, provide a driving connection between the members 2 and 3.

With the exception of the spherical exterior of the member 3, the structure thus far described is substantially that of a conventional constant velocity universal joint which is characterized by difficulty in retaining a lubricant therein. The present invention, therefore, contemplates an enclosure and seal for retaining the lubricant in the grooves 23 and 24 in which the balls 22 operate, as now to be described.

In accordance with the present invention, the joint as above described is enclosed in a housing 25 having a generally cylindrical wall 26 encircling the outer member 3 of the joint, and a closed end 27 which has a bearing collar 28 rotatably journaled on the shaft 4. The opposite end of the housing 25 is open as at 29 to accommodate movement of the shaft 5 when the joint is in operation.

The housing 25 also includes means to form a seal about the spherical surface 8' of the member 3. In the illustrated form of the invention, the seal is effected by sealing rings 30 and 31 that are inset within the housing and have partially spherical inner faces 32 and 33 in contact with the spherical face 8' of the member 3. The sealing ring 31 cooperates with the member 3 in closing the open end 29 of the housing to contain a lubricant, as indicated at 34, therein. To enhance sealing action of the ring 31, the inner circumference thereof has a circumferential groove 35 for containing an O ring 36 therein and which forms a resilient packing between the member 3 and the sealing ring 31. The sealing ring 31 is retained within the housing 25 preferably by a split locking ring 37 which is inset within a groove 38 encircling the open end of the housing. The sealing ring 30 is yieldingly retained against the exterior surface of the member 3 by springs 39. The springs 39 have one end seated within sockets 40 of lugs 41 located at the juncture of the end wall 27 with the annular wall 26, and the other ends bear upon the ring to urge the ring into contact with the member 3. The housing 25 is fixed from longitudinal movement on the shaft 4 by means of a snap ring 42 engaged in an annular groove 43 of the shaft 4 and in a groove 44 encircling the shaft at the outer end of the bearing 28.

In assembling the joint, the springs 39 are seated in the sockets 40 and the sealing ring 30 is pushed into the housing to be engaged by the ends of the springs 39. The housing is sleeved over the outer end of the shaft 4 until the bearing 28 passes the groove 43. The snap ring 42 is then inserted in the groove 43. The members 2 and 3 of the joint may have been previously assembled on the shaft 4 with the retainer 18 and balls 22 engaging in the grooves 23 and 24, or the joint assembly may be applied through the open end of the housing, with the member 2 passing over the splined end of the shaft 4 and seated within the sealing ring 30. The outer sealing ring 31 carrying the O ring 36 in the groove 35 is slid over the outer end of the shaft 5 and into the housing in seating contact with the spherical surface 8' of the member 3, after which the expansion ring 37 is passed over the outer end of the shaft 5 and moved into seating engagement with the groove 38 for backing the sealing ring 31 and retain the parts in assembly. The lubricant 34 may be inserted in the housing through an axial passageway 45 in the shaft 5. A sufficient quantity of lubricant is inserted to fill the space within the housing, including the grooves 23 and 24 and the space within the spherical cavity 6 of the member 3.

When the joint is used in an installation where the shaft 4 rotates on a fixed axis and the shaft 5 moves at an angle relative to the shaft 4 as the shaft 5 is rotated, the balls 22 travel back and forth within the grooves 23 and 24 upon changing angularity of the shaft, as shown in Fig. 2, with the retainer 18 oscillating about the center of the joint 10. It is obvious that as the balls at one side of the joint push the lubricant from the grooves at that side, pressure is applied to the confined lubricant for forcing the lubricant into the corresponding ends of the grooves at the opposite side of the joint. Likewise, the lubricant, after it is expelled from the opposite ends of that side of the joint, is forced into the ends of the groove at the opposite side of the joint, thereby maintaining the grooves full of lubricant for adequate lubrication of the balls and the grooves throughout the entire movement of the joint. It is obvious that since the seal is effected without the use of resilient boots or the like, as in conventional practice, any pressure applied to the lubricant is transmitted throughout the entire body of the lubricant, because the lubricant is confined from all sides by rigid walls of the housing and by the seals between the housing 25 and member 3.

From the foregoing, it is obvious that I have provided a constant velocity universal joint, wherein the joint is provided with a housing which allows for free action of the shafts and confines a lubricant in constant contact with all moving parts of the joint, this being effected by action of the joint because the lubricant displaced at one side thereof fills the spaces from which lubricant is being displaced at opposite side of the joint.

What I claim and desire to secure by Letters Patent is:

1. A universal joint including ball and socket members with the ball member movable within the socket member and said members having registering grooves in facing surfaces of said members, key members in said grooves for interconnecting the ball and socket members in driving and driven relation and movable in said grooves when the joint is in operation, said socket member having a spherical periphery, a housing having concentric support with the axis of the ball member and having an open opposite side, a ring within the housing and encircling said open side, said ring having an inner face conforming to the spherical periphery of the socket member to seat the socket member within the housing, a similar ring for sliding movement in the housing and having the inner face thereof in contact with the spherical periphery of the socket member and cooperating with the first named ring in providing an exterior bearing support for the socket member, and means for resiliently urging the last named ring in yielding contact with the socket member and the socket member in yielding contact with the first named ring.

2. A universal joint including ball and socket members with the ball member movable within the socket member and said members having registering grooves in facing surfaces of said members, key members in said grooves for interconnecting the ball and socket members in driving and driven relation, said socket member having a spherical periphery, a housing having a support on the ball member and having an open opposite side, a ring within the housing and encircling said open side, said ring having an inner face conforming to the spherical periphery of the socket member, a similar ring for sliding movement in the housing and having the inner face thereof in contact with the spherical periphery of the socket member and cooperating with the first named ring in providing an exterior bearing support for the socket member, and an oil sealing ring carried by the first named ring and having contact with the spherical periphery of the socket member for containing a lubricant within said housing.

3. A universal joint including driving and driven rotatable members relatively oscillatable about a common point, means for interconnecting said members one within the other for rotation of one of the members on different axes extending through said point, the outer of said members having a spherical surface, a housing having concentric support with the axis of the inner member and having an open opposite side, a ring having fixed support within the housing and encircling said open side, said ring having an inner face conforming to and contacting the spherical surface of the outer member to seat said outer member within the housing, a similar ring for sliding movement in the housing toward the first named ring and having the inner face thereof in contact with the spherical surface of the outer member and cooperating with the first named ring in providing an exterior bearing support for the outer member, and means for resiliently urging the last named ring in yielding contact with the spherical surface of the outer member and the outer member into yielding contact with the first named ring for maintaining a lubricant seal with said spherical surface of the outer member.

4. A universal joint as described in claim 3, and an oil sealing ring carried by the first named ring and having contact with the spherical periphery of the outer member for enhancing the lubricant seal.

5. A universal joint including driving and driven rotatable members relatively oscillatable about a common point, means for interconnecting said members one within the other for rotation of one of the members on different axes extending through said point, the outer of said members having a spherical surface, a housing having concentric support with the axis of the inner member and having an open opposite side through which said members are adapted to be inserted into the housing, a ring within the housing and encircling said open side, said ring having an inner face conforming to and contacting the spherical surface of the outer member, means removably connected with the housing for backing said ring, a similar ring for sliding movement within the housing toward the first named ring and having the inner face thereof in contact with the spherical surface of the outer member and cooperating with the first named ring in providing an exterior bearing support for the outer member, and means for resiliently urging the last named ring in yielding contact with the spherical surface of the outer member and the outer member into yielding contact with the first named ring for maintaining a lubricant seal with said spherical surface of the outer member.

References Cited in the file of this patent

UNITED STATES PATENTS

| | | |
|---|---|---|
| 1,524,161 | Weiss | Jan. 27, 1925 |
| 2,033,583 | McCarrell | Mar. 10, 1936 |
| 2,211,388 | Salvetti | Aug. 13, 1940 |
| 2,653,456 | Heym | Sept. 29, 1953 |